United States Patent
Li et al.

(10) Patent No.: US 11,899,896 B2
(45) Date of Patent: Feb. 13, 2024

(54) FLEXIBLE SCREEN TERMINAL AND DISPLAY METHOD THEREFOR, AND COMPUTER-READABLE STORAGE MEDIUM

(71) Applicant: ZTE Corporation, Shenzhen (CN)

(72) Inventors: Xipeng Li, Shenzhen (CN); Song Dang, Shenzhen (CN); Yi Wang, Shenzhen (CN); Xiaohong Chai, Shenzhen (CN); Jiani Zhang, Shenzhen (CN); Ningyuan Wu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 17/601,568

(22) PCT Filed: Jul. 8, 2020

(86) PCT No.: PCT/CN2020/100803
§ 371 (c)(1),
(2) Date: Oct. 5, 2021

(87) PCT Pub. No.: WO2021/042866
PCT Pub. Date: Mar. 11, 2021

(65) Prior Publication Data
US 2022/0206643 A1   Jun. 30, 2022

(30) Foreign Application Priority Data
Sep. 6, 2019 (CN) .......................... 201910845758.8

(51) Int. Cl.
*G06F 3/04886* (2022.01)
*G06F 3/0481* (2022.01)
*G06F 1/16* (2006.01)

(52) U.S. Cl.
CPC .......... *G06F 3/0481* (2013.01); *G06F 1/1652* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

2013/0221840 A1   8/2013 Oh
2014/0035869 A1   2/2014 Yun et al.
(Continued)

FOREIGN PATENT DOCUMENTS

CN   105204800 A   12/2015
CN   107623763 A   1/2018
(Continued)

OTHER PUBLICATIONS

CN108196741A (Eng Translation) Published on Jun. 22, 2018 by Chen, Pengfei.*
(Continued)

*Primary Examiner* — Rinna Yi
(74) *Attorney, Agent, or Firm* — Vivacqua Crane, PLLC

(57) ABSTRACT

Disclosed are a flexible screen terminal device and a display method therefor, and a non-transitory computer-readable storage medium. The display method may include: determining a folding boundary line corresponding to a folding operation in response to a detection of the folding operation corresponding to the flexible screen terminal; and performing a split-screen display operation based on the folding boundary line and a preset display rule of the flexible screen terminal device.

20 Claims, 1 Drawing Sheet

S100 — In response to a detection of a folding operation corresponding to a flexible screen terminal device, determine a folding boundary line corresponding to the folding operation S200 — Based on the folding boundary line and a preset display rule of the flexible screen terminal, perform a split-screen display operation

(56) References Cited

U.S. PATENT DOCUMENTS

| | | | |
|---|---|---|---|
| 2014/0055375 A1* | 2/2014 | Kim | G06F 1/1652 |
| | | | 345/173 |
| 2014/0062976 A1 | 3/2014 | Park et al. | |
| 2016/0109973 A1* | 4/2016 | Kim | G06F 3/04886 |
| | | | 345/173 |
| 2017/0045996 A1* | 2/2017 | Ka | G09G 3/035 |
| 2017/0131879 A1 | 5/2017 | Lee et al. | |
| 2017/0177096 A1 | 6/2017 | Cheong et al. | |

FOREIGN PATENT DOCUMENTS

| | | |
|---|---|---|
| CN | 108196741 A | 6/2018 |
| CN | 108449489 A | 8/2018 |
| EP | 3896946 A1 | 10/2021 |

OTHER PUBLICATIONS

CN107623763A (Eng Translation) Published on Jan. 23, 2018 by Chen Zhenzhen.*
International Searching Authority, International Search Report and Written Opinion for PCT Application No. PCT/CN2020/100803 and English translation, dated Oct. 12, 2020, pp. 1-11.
European Patent Office. Extended European Search Report for EP Application No. 20860803.4, dated Jun. 9, 2022, pp. 1-8.

* cited by examiner

FLEXIBLE SCREEN TERMINAL AND DISPLAY METHOD THEREFOR, AND COMPUTER-READABLE STORAGE MEDIUM

CROSS REFERENCE TO RELATED APPLICATIONS

This application is a national stage filing under 35 U.S.C. § 371 of international application number PCT/CN2020/100803, filed Jul. 8, 2020, which claims priority to Chinese patent application No. 201910845758.8, filed Sep. 6, 2019. The contents of these applications are incorporated herein by reference in their entirety.

TECHNICAL FIELD

The present disclosure relates to the field of display technology.

BACKGROUND

Due to the characteristics of flexible screen display devices such as foldability and bendability, the type of intelligent terminal devices with such flexible screen display devices have growing popularity in the market at present. However, due to the limitation of hardware development, the technology of flexible screen display device is lacking in the industry.

A flexible screen terminal device of related technologies may be merely characterized in its foldable screen with a fixed folding position, and the terminal device only can perform a split-screen display according to a proportion preset in the terminal device corresponding to the folding position. In other words, the terminal device cannot be folded into a position selected by a user, as a result, the split-screen display of the flexible screen cannot be performed according to the user's needs, leading to impaired user experience.

SUMMARY

According to an aspect of the present disclosure, a display method for a flexible screen terminal device is provided. The method may include: determining a folding boundary line corresponding to a folding operation in response to a detection of the folding operation corresponding to the flexible screen terminal; and performing a split-screen display operation based on the folding boundary line and a preset display rule of the flexible screen terminal device.

According to another aspect of the present disclosure, a flexible screen terminal device is provided. The terminal device may include a memory, a processor and a display program of the flexible screen terminal stored in the memory and executable on the processor. The display program of the flexible screen terminal, when executed by the processor, causes the processor to perform at least one of steps of the display method for the flexible screen terminal device described above.

According to yet another aspect of the present disclosure, a non-transitory computer-readable storage medium storing a display program of a flexible screen terminal device is provided. The display program of the flexible screen terminal, when executed by a processor, cause the processor to perform at least one of steps of the display method for the flexible screen terminal device described above.

The purpose, functional features and advantages of the present disclosure will be further explained with reference to the drawings in combination with embodiments.

DETAILED DESCRIPTION

It should be understood that, the embodiments described herein are used to explain the present disclosure, and are not intended to limit the present disclosure.

Figure 1:
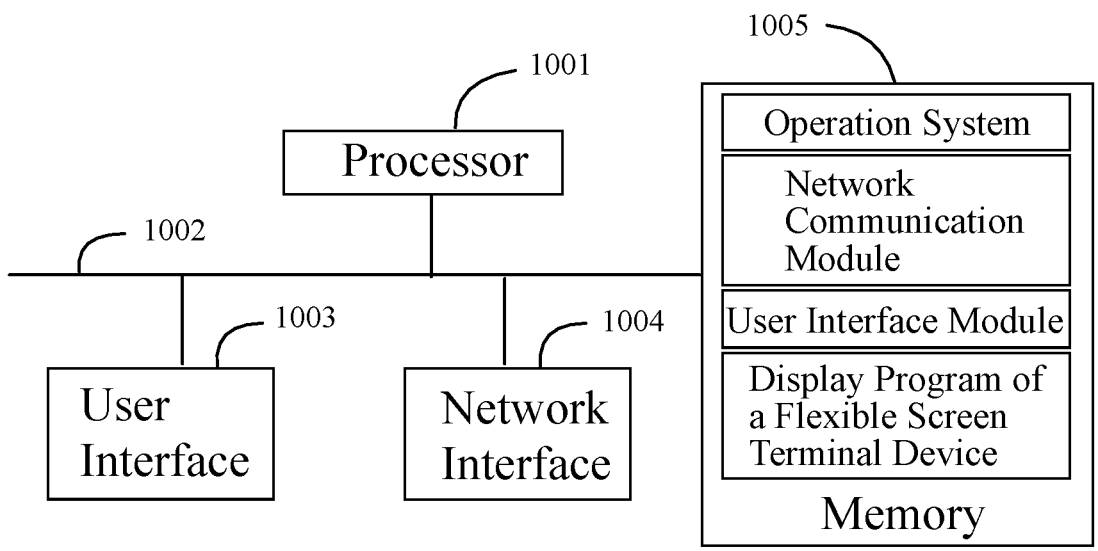
FIG. 1 is a schematic structural diagram of a flexible screen terminal according to an embodiment of the present disclosure.

As shown in FIG. 1, which is a schematic structural diagram of a flexible screen terminal device according to an embodiment of the present disclosure, showing the hardware running environment of the flexible screen terminal device. The flexible screen terminal device may be a foldable terminal device with a display function such as a smart phone, a tablet computer and an e-book reader.

As shown in FIG. 1, the flexible screen terminal may include a processor 1001, such as a Central Processing Unit (CPU), a network interface 1004, a user interface 1003, a memory 1005, and a communication bus 1002. The communication bus 1002 can be configured to enable connection and communication between these components. The user interface 1003 may include a display screen and an input unit such as a keyboard. The user interface 1003 may also include a standard wired interface and a wireless interface. The network interface 1004 may include a standard wired interface and a wireless interface (such as a Wi-Fi (mobile hotspot) interface). The memory 1005 may be a high-speed RAM or a non-volatile memory, such as a disk memory. The memory 1005 may also be a storage device independent of the processor 1001 mentioned above.

According to an embodiment of the present disclosure, the flexible screen terminal device may also include a camera, a radio frequency (RF) circuit, a sensor, an audio circuit, a Wi-Fi module, etc. The sensor may include a light sensor, a motion sensor and other sensors. The light sensor may include an ambient light sensor and a proximity sensor. The ambient light sensor can be used to adjust the brightness of the display screen according to the brightness of ambient light, and the proximity sensor can be used to turn off the display screen and/or backlight when the flexible screen terminal device is moved to ears. As a kind of motion sensor, the gravity acceleration sensor can be configured to detect the magnitude of acceleration in all directions (generally triaxial), and detect the magnitude and direction of gravity at rest. The gravity acceleration sensor can be used in the applications of the attitude of the flexible screen terminal device e.g., horizontal and vertical screen switching, related games, magnetometer attitude calibration, vibration identification related functions, e.g., pedometer, tapping, and so on. In other embodiments, the flexible screen terminal can also be configured with other sensors, e.g., a gyroscope, a barometer, a hygrometer, a thermometer, an infrared sensor, etc., which will not be described in detail here.

It can be understood by those having ordinary skill in the art that, the structure of the flexible screen terminal shown in FIG. 1 does not constitute a limitation of the flexible screen terminal, and may include more or fewer components than shown, or a combination of some components, or a different arrangement of components.

As shown in FIG. 1, as a computer storage medium, the memory 1005 may include an operating system, a network communication module, a user interface module and a display processing program.

In the flexible screen terminal shown in FIG. 1, the network interface 1004 may be mainly configured to connect to a background server for data communication with the background server. The user interface 1003 may be mainly configured to connect to a client (user terminal) for data communication with the client. The processor 1001 may be configured to call the display processing program stored in the memory 1005.

According to an embodiment of the present disclosure, the flexible screen terminal device may include a memory 1005, a processor 1001, and a display processing program stored in the memory 1005 and executable on the processor 1001. The processor 1001 can call the display processing program stored in the memory 1005 to perform the following operations: determining a folding boundary line corresponding to a folding operation when the folding operation corresponding to the flexible screen terminal is detected; and performing a split-screen display operation on the basis of the folding boundary line and a preset display rule of the flexible screen terminal.

According to an embodiment of the present disclosure, the processor 1001 can call the display processing program stored in the memory 1005 to perform the following operations: determining whether the folding operation is a valid folding operation when the folding operation corresponding to the flexible screen terminal is detected; acquiring coordinate information corresponding to the folding operation if the folding operation is a valid folding operation; and determining the folding boundary line on the basis of the coordinate information.

According to an embodiment of the present disclosure, the processor 1001 can call the display processing program stored in the memory 1005 to perform the following operations: determining whether a folding angle corresponding to the folding operation reaches a preset angle; and determining that the folding operation is a valid folding operation if the folding angle reaches the preset angle.

According to an embodiment of the present disclosure, the processor 1001 can call the display processing program stored in the memory 1005 to perform the following operations: determining whether a touch operation is detected in a display area to which the folding operation belongs within a preset time period when the folding operation corresponding to the flexible screen terminal is detected; acquiring a touch parameter corresponding to the touch operation if the touch operation is detected; determining whether the touch parameter meets a preset condition; and determining that the folding operation is a valid folding operation when the touch parameter meets the preset condition.

According to an embodiment of the present disclosure, the processor 1001 can call the display processing program stored in the memory 1005 to perform the following operations: determining whether a sliding distance reaches a first preset distance; and determining that the touch parameter meets the preset condition if the sliding distance reaches the first preset distance.

According to an embodiment of the present disclosure, the processor 1001 can call the display processing program stored in the memory 1005 to perform the following operations: determining whether a number of pressing times reaches a preset number of times and whether a distance between touch points is greater than a second preset distance; and determining that the touch parameter meets the preset condition if the number of pressing times reaches the preset number of times and the distance between touch points is greater than the second preset distance.

According to an embodiment of the present disclosure, the processor 1001 can call the display processing program stored in the memory 1005 to perform the following operations: acquiring a coordinate set of touch points corresponding to the touch operation; and determining the coordinate information according to the coordinate set of touch points.

According to an embodiment of the present disclosure, the processor 1001 may call the display processing program stored in the memory 1005 to perform the following operations: determining a screen included angle between a first display area and a second display area corresponding to the flexible screen terminal device on the basis of the folding boundary line; and performing the split-screen display operation on the basis of the screen included angle and the preset display rule.

Figure 2:
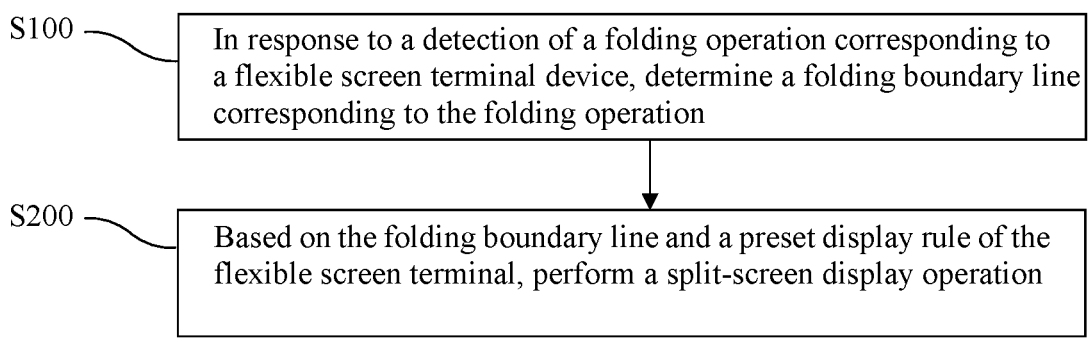
FIG. 2 is a flow diagram of a display method for a flexible screen terminal according to an embodiment of the present disclosure.

According to an embodiment of the present disclosure, a display method for a flexible screen terminal device is further provided, as shown in FIG. 2. FIG. 2 is a flow diagram of the display method for the flexible screen terminal device according to an embodiment of the present disclosure. The display method for the flexible screen terminal device may include steps S100-S200.

At S100, a folding boundary line corresponding to a folding operation is determined when the folding operation corresponding to a flexible screen terminal device is detected.

According to an embodiment of the present disclosure, whether the flexible screen is in a screen-on state is determined. If the flexible screen is in a screen-off state, the flexible screen terminal device does not respond to a user's folding operation of the flexible screen.

When the folding operation of the flexible screen is detected by a folding detection unit of the flexible screen terminal device, whether the folding operation is valid is determined on the basis of a preset folding parameter. If the folding operation is determined as being invalid, the folding detection unit does not report this event to the processing unit of the flexible screen terminal device. If the folding operation is determined as being valid, the folding detection unit reports this event to the processing unit of the flexible screen terminal device. The processing unit acquires a coordinate set of operation points in the valid folding process, performs a regression analysis for the coordinate set, fits a linear line with the smallest square error, and determines whether the error is within a preset error range, where the preset error range can be flexibly set. If the error is within the preset error range, the linear line is the corresponding valid folding boundary line in the valid folding operation. If the error is not within the preset error range, the fitted linear line is determined to be invalid, a message prompt that the folding boundary line cannot be identified is sent, and a prompt for the user to reconfirm the folding boundary line is sent at the same time.

According to an embodiment of the present disclosure, the preset folding parameter can be flexibly configured according to specific situations. For example, the preset folding parameter may be a folding angle, which refers to a change value of an included angle of a display interface of the flexible screen terminal device during folding. The change value can be set flexibly, which is not limited here. For another example, assuming that the preset folding angle is 30 degrees, the folding operation is determined as a valid folding operation only when the folding angle reaches 30 degrees during folding. The preset folding parameter may also be a sliding distance at the folding boundary, which can be set flexibly and is not specified here. For example, at the time when the folding stops, the user can perform a sliding operation from bottom to top on the touch screen at the folding boundary. When the sliding distance corresponding to the sliding operation reaches a preset sliding distance, the folding operation is determined as a valid folding operation. The preset folding parameter may also be the number of pressing times of the pressing operation at the folding boundary within a preset time period and a distance between touch points corresponding to the pressing operation. The preset time period and the distance between touch points can be set flexibly, and the preset times are twice or more, which is not specified here. For example, at the time when the folding stops, the folding operation is determined as a valid folding operation when the number of user's pressing times reaches the preset number of times and the distance between any two touch points corresponding to the pressing operation reaches a preset touch distance within a preset time period.

At S200, a split-screen display operation is performed on the basis of the folding boundary line and a preset display rule of the flexible screen terminal device.

According to an embodiment of the present disclosure, when position information of the folding boundary line is obtained, display content of the display interface before split-screen is obtained, and the screen display area is split into two areas with the folding boundary line as the boundary. The two areas are in the same horizontal plane before folding. After the two display areas are determined, corresponding display operations are executed for the two display areas on the basis of the preset display rule. The preset display rule can be set flexibly, which is not limited here.

For example, in a folding process, when it is detected that the rear covers of the flexible screen terminal device are approaching to each other, and that the folding angle in a folding direction is greater than a second preset angle and less than a first preset angle, and the folding angle is within this preset range for a first preset time, where the first preset angle, the second preset angle and the first preset time can be flexibly set and are not specified here, for example, when it is detected that the folding angle is greater than 100 degrees and less than 150 degrees, and the folding angle is within this range for 3 s, the display content of the display interface before split-screen is displayed in two display areas at the same time, and the interface layouts of the display contents in the two display areas are adjusted respectively according to a proportion of the two display areas to the main screen display area before split-screen.

When it is detected that the folding angle is greater than a third preset angle and less than the second preset angle, and that the folding angle is within this preset range for a second preset time, where the third preset angle and the second preset time can be set flexibly and are not specified here, for example, when it is detected that the folding angle is greater than 50 degrees and less than 100 degrees and the folding angle is within this range for 5 s, infrared signals radiated by human body are detected by infrared sensors in the two display areas, and the strengths of the infrared signals in the two display areas are respectively acquired and on of the display area with higher signal strength is determined. The display content of the display interface before split-screen is displayed in the display area with the higher signal strength, and the desktop interface of the terminal device is displayed in the other display area. The interface layouts of the display contents in the two display areas are adjusted respectively according to a proportion of the display areas to the main screen display area before split-screen. If it is detected that the strengths of the infrared signals in the two display areas are the same, a prompt message for display area selection will be sent, and the display content of the display interface before split-screen will be displayed in the selected area on the basis of the user's display area selection, while the desktop interface of the terminal device will be displayed in the other display area.

When it is detected that the folding angle is less than the third preset angle, where the third preset angle can be set flexibly and is not specifically set here, for example, when it is detected that the folding angle is less than 50 degrees, infrared signals radiated by human body are detected by infrared sensors in the two display areas, the strengths of the infrared signals in the two display areas are respectively acquired and one of the display areas with higher signal strength is determined; the display content of the display interface before split-screen is displayed in the display area with the higher signal strength, and the interface layout of the display content in the display area is adjusted according to the proportion of the display area to the main screen display area before split-screen; and the other display screen is turned off. If it is detected that the strengths of the infrared signals in the two display areas are the same, a prompt message for display area selection is sent, and the corresponding display content is displayed in the selected area on the basis of the user's display area selection, while the other display screen is turned off.

In the folding process, when it is detected that the two ends of the display screen of the flexible screen terminal device are in a trend of approaching to each other and that the folding operation stops, an overlapping portion between the two parts of the screen is detected by the sensor of the flexible screen terminal device. The overlapping portion refers to a display area with smaller display size and a projection part of the display area with smaller display size in a normal direction on the other display area after the flexible screen is folded. If the proportion of the overlapping portion between the two screen areas in the main screen display area is more than 70% before split-screen, it is determined that the folding process is invalid. If the proportion of the overlapping portion between the two screen areas in the main screen display area is less than or equal to 30% before split-screen, the display area of the overlapping portion is turned off after the overlapping portion between the two screen areas is determined, the display content of the display interface before split-screen is displayed in a non-overlapping display area, and the interface layout of the display content in the non-overlapping display area is adjusted according to the proportion of the non-overlapping display area to the main screen display area before split-screen.

According to an embodiment of the present disclosure, a folding boundary line corresponding to a folding operation is determined when the folding operation of the flexible screen terminal device is detected, and a split-screen display operation is performed on the basis of the folding boundary line and a preset display rule of the flexible screen terminal device. In this way, the flexible screen terminal device can perform split-screen display on the basis of the folding boundary line corresponding to the folding operation, such that the flexible screen terminal device can perform split-screen display on the basis of a folding operation of a user at any position, so as to meet the requirements of various folding positions of the user and improve the user experience.

According to an embodiment of the present disclosure, the step S100 may include steps S110 to S130.

At S110, whether the folding operation is a valid folding operation is determined, when the folding operation corresponds to the flexible screen terminal device is detected.

At S120, coordinate information corresponding to the folding operation is acquired when the folding operation is a valid folding operation.

At S130, the folding boundary line is determined on the basis of the coordinate information acquired.

According to an embodiment of the present disclosure, when a user's folding operation is detected, whether the folding operation is a valid folding operation is determined according to a preset folding parameter, where the preset folding parameter can be flexibly set according to the situation, which is not limited here. For example, when an angle sensor is included in the flexible screen terminal device, which is configured to detect the folding angle in the folding process, and a processing program of the terminal device is programmed to calculate a change value of the folding angle. When it is detected that the change value of the folding angle reaches a preset value, the folding operation is determined as a valid folding operation, where the preset value can be set flexibly and is not specifically set here. Alternatively, whether the folding operation is a valid folding operation can be determined according to touch parameters of other touch operations detected by the flexible screen terminal device.

Then, if the folding operation is a valid folding operation, the coordinate information corresponding to the folding operation is acquired, and the folding boundary line is determined on the basis of the coordinate information.

For example, when it is detected that the change value of the folding angle reaches 15 degrees, a folding detection unit of the terminal device reports this event to a processing unit. The processing unit receives and obtains the coordinate information of folding points in the folding process, performs a regression analysis for the coordinate points of the coordinate information, and fits a linear line with the largest determination coefficient. The determination coefficient of the linear line is within a preset determination coefficient range, and the linear line is used as the corresponding valid folding boundary line in the valid folding operation. The preset determination coefficient range can be set flexibly, such as 0.85~1.00, which is not limited here.

According to an embodiment of the present disclosure, whether the folding operation is a valid folding operation is determined when the folding operation corresponding to the flexible screen terminal device is detected; and coordinate information corresponding to the folding operation is acquired if the folding operation is a valid folding operation; then, the folding boundary line is determined on the basis of the coordinate information, that is, the folding boundary line corresponding to the valid folding operation is determined by acquiring the coordinate information of the operation points at the folding boundary, which can accurately determine the folding position corresponding to the folding operation, improve the accuracy of the folding boundary line, and further improve the accuracy of split-screen display.

According to an embodiment of the present disclosure, step S110 may include step S111.

At step S111, it is determined whether a folding angle corresponding to the folding operation reaches a preset angle, and it is determined that the folding operation is a valid folding operation when the folding angle reaches the preset angle.

According to an embodiment of the present disclosure, the folding angle refers to a change value of an included angle of a display interface of the flexible screen terminal device during folding, where a value of a preset angle can be flexibly set and is not limited here. For example, assuming that the preset angle is 30 degrees, when a user performs a folding operation, the folding detection unit of the terminal device acquires the folding angle in the folding process through the angle sensor and detects whether the folding angle reaches 30 degrees in the process. When the folding angle reaches 30 degrees, the folding operation is determined as a valid folding operation.

According to an embodiment of the present disclosure, it is determined whether the folding angle corresponding to the folding operation reaches the preset angle, and it is determined that the folding operation is a valid folding operation if the folding angle reaches the preset angle. In this way, whether the folding operation is a valid folding operation can be accurately determined according to the folding angle, and the judgment accuracy of the valid folding operation is improved. Thus, the accuracy of split-screen display is improved, and the user experience is improved.

According to an embodiment of the present disclosure, step S110 may further include steps S112 to S114.

At step S112, it is determined whether a touch operation corresponding to the display area to which the folding operation belongs is detected within a preset time period, when the folding operation corresponding to the flexible screen terminal device is detected.

At step S113, a touch parameter corresponding to the touch operation is acquired if the touch operation is detected.

At step S114, it is determined whether the touch parameter meets a preset condition, and it is determined that the folding operation is a valid folding operation if it is determined that the touch parameter meets the preset condition.

According to an embodiment of the present disclosure, when it is determined that the user's folding operation stops, the detection unit detects whether a touch operation on the folding boundary touch screen is detected within a preset time period. If the touch operation on the folding boundary touch screen is not detected within the preset time period, it is determined that the folding operation is an invalid folding operation, then a prompt instruction that the operation process is wrong is sent, and a prompt message of executing a touch operation on the folding boundary touch screen within the preset time period is sent at the same time. The preset time can be set flexibly, such as 3 seconds; and the touch operation may be sliding or pressing, which is not limited here.

If the touch operation on the folding boundary touch screen is detected within the preset time period, the detection unit acquires a touch parameter corresponding to the touch operation, and detects whether the touch parameter meet a preset condition. If the touch parameter meets the preset condition, it is determined that the folding operation is a valid folding operation. If the touch parameter does not meet the preset condition, it is determined that the folding operation is an invalid folding operation, and a prompt message that the touch operation is invalid is sent. The preset condition can be set according to the situation. For example, when the recognizable operation of the terminal device is a sliding operation, the parameter corresponding to the sliding operation is a sliding distance, and the preset condition is a specific sliding distance, which can be set flexibly, such as 5 cm.

According to an embodiment of the present disclosure, step S114 may include: determining whether the sliding distance reaches a first preset distance, and determining that the touch parameter meets the preset condition if the sliding distance reaches the first preset distance.

According to an embodiment of the present disclosure, if the touch operation is a sliding touch operation, the detection unit detects the sliding touch operation event, acquires a sliding distance corresponding to the sliding touch operation, and detects whether the sliding distance reaches a first preset distance. The first preset distance refers to the preset sliding distance during the sliding touch by the user, and the preset sliding distance value can be set flexibly, for example, 5 cm. If the sliding distance reaches the first preset distance, it is determined that the folding operation is a valid folding operation. If the sliding distance does not reach the first preset distance, it is determined that the folding operation is an invalid folding operation, and a prompt message that the sliding touch operation is invalid and the touch process is too short is sent. Then, whether the folding operation is a valid folding operation can be accurately determined according to the sliding distance, which improves the judgment accuracy of the valid folding operation.

According to an embodiment of the present disclosure, step S114 may include step S116.

At step S116, it is determined whether a number of pressing times reaches a preset number of times and a distance between touch points is greater than a second preset distance; and it is determined that the touch parameter meets the preset condition if the number of pressing times reaches the preset number of times and the distance between touch points is greater than the second preset distance.

According to an embodiment of the present disclosure, if the touch operation is a pressing operation, the detection unit detects the pressing operation event, acquires the pressing times corresponding to the pressing operation, and detects whether the number of pressing times reach the preset number of pressing times. The preset number of pressing times are twice or more, and can be set flexibly, which is not specified here. If the number of pressing times does not reach the preset number of pressing times, a prompt message of insufficient pressing times is sent. If the number of pressing times reaches the preset pressing times, a distance between two farthest pressing points in the pressing points corresponding to the pressing operation is acquired. If the distance between the two farthest pressing points in the pressing points corresponding to a user's pressing operation is greater than the second preset distance, it is determined that the folding operation is a valid folding operation. If the distance between the two farthest pressing points in the pressing points corresponding to the user's pressing operation does not reach the preset distance, it is determined that the pressing operation is an invalid folding operation, and a prompt message that the pressing operation distance is too short to be confirmed is sent to the user. The second preset distance value can be flexibly set, such as 3 cm. In this way, whether the folding operation is a valid folding operation can be accurately determined according to the pressing times and the distance between touch points, which improves the judgment accuracy of the valid folding operation.

According to an embodiment of the present disclosure, when the folding operation corresponding to the flexible screen terminal device is detected, it is determined whether the touch operation corresponding to the display area to which the folding operation belongs is detected within a preset time period; a touch parameter corresponding to the touch operation is acquired if the touch operation is detected, and whether the touch parameter meets the preset condition is determined; then, if the touch parameter meets the preset condition, it is determined that the folding operation is a valid folding operation. In this way, whether the folding operation is a valid folding operation can be accurately determined according to the touch parameter, which improves the judgment accuracy of the valid folding operation, improves the accuracy of split screen display, improves the user experience, avoids the user's misoperation, makes the user operation more convenient and flexible, and further improves the user experience.

According to an embodiment of the present disclosure, step S120 may include step S121 and step S122.

At step S121, a coordinate set of touch points corresponding to the touch operation is acquired.

At step S122, coordinate information is determined on the basis of the coordinate set of touch points.

According to an embodiment of the present disclosure, if the touch parameter meets the preset condition, a coordinate of each of the touch points corresponding to the touch operation can be determined by a pressure sensor corresponding to the flexible screen, thus obtaining a coordinate set of the touch points. Then, a regression analysis is performed for the coordinate set of touch points to fit a linear line with the largest determination coefficient, and it is determined whether the determination coefficient of the linear line is within a preset determination coefficient range. The preset determination coefficient range can be set flexibly, such as 0.85~1.00. If the determination coefficient is within the preset determination coefficient range, the coordinates of the touch points located on the linear line in the coordinate set of touch points can be taken as the coordinate information. If the touch points located on the linear line in the coordinate set of touch points is less than 2, the coordinates of any two or more points on the linear line can be taken as the coordinate information.

According to an embodiment of the present disclosure, the coordinate set of touch points corresponding to the touch operation is acquired and then the coordinate information is determined on the basis of the coordinate set of touch points, so that the coordinate information can be accurately determined according to the touch operation, and then the folding position corresponding to the folding operation can be accurately determined, thereby improving the accuracy of the folding boundary line and the accuracy of split-screen display.

According to an embodiment of the present disclosure, the step S200 may include steps S201 to S202.

At S201, a screen included angle between a first display area and a second display area corresponding to the flexible screen terminal device is determined on the basis of the folding boundary line.

At S202, the split-screen display operation is performed on the basis of the screen included angle and the preset display rule.

According to an embodiment of the present disclosure, when the position information of the folding boundary line is obtained, the display content of the display interface before split-screen is obtained, and the screen display area is split into a first display area and a second display area with the folding boundary line as a boundary. After the two display areas are determined, the included angle between the two display areas are determined by the angle sensor in the terminal device, and the corresponding display operations for the two display areas are performed on the basis of the screen included angle and the preset display rule. The preset display rules can be set flexibly, which is not limited here.

For example, in the folding process, when it is determined that the rear covers of the flexible screen terminal device is in the trend of approaching each other and detected that the folding angle in the folding direction is greater than a second preset angle and less than a first preset angle and the folding angle is within this preset range for a first preset time, where the first preset angle, the second preset angle and the first preset time can be set flexibly and are not specified here, for example, when it is determined that the folding angle is greater than 100 degrees and less than 150 degrees and the folding angle is within this range for 3 s, the display content of the display interface before split-screen is displayed in both the display areas at the same time, and the interface layouts of the display contents in the two display areas are adjusted respectively according to a proportion of the two display areas to the main screen display area before split-screen.

When it is determined that the folding angle is greater than a third preset angle and less than the second preset angle and the folding angle is within the preset range for a second preset time (where the third preset angle and the second preset time can be set flexibly and are not specified here), for example, when it is determined that the folding angle is greater than 50 degrees and less than 100 degrees and the folding angle is within this range for 5 s, the infrared signals radiated by human body are detected by the infrared sensors in the two display areas, and the strengths of the infrared signals in the two display areas are respectively acquired and one of the display areas with higher signal strength is determined. The display content of the display interface before split-screen is displayed in the display area with the higher signal strength, and the desktop interface of the terminal device is displayed in the other display area; and the interface layouts of the display contents in the two display areas are adjusted respectively according to a proportion of the display areas to the main screen display area before split-screen. When it is determined that the strengths of the infrared signals in the two display areas are the same, a prompt message for display area selection will be sent, and the display content of the display interface before split-screen will be displayed in the selected area on the basis of the user's display area selection, while the desktop interface of the terminal device will be displayed in the other display area.

When it is determined that the folding angle is less than the third preset angle (where the third preset angle can be set flexibly and is not specifically set here), for example, when it is determined that the folding angle is less than 50 degrees, the infrared signals radiated by human body are detected by the infrared sensors in the two display areas, the strengths of the infrared signals in the two the display areas are respectively acquired and one of the display areas with higher signal strength is determined. The display content of the display interface before split-screen is displayed in the display area with the higher signal strength, and the interface layout of the display content in the display area is adjusted according to the proportion of the display area to the main screen display area before split-screen; and the other display screen is turned off. When it is determined that the strengths of the infrared signals in the two display areas are the same, a prompt message for display area selection is sent, the corresponding display content is displayed in the selected area on the basis of the user's display area selection, while the other display screen is turned off.

During the folding process, when it is detected that the ends of the display screen of the flexible screen terminal device are in a trend of approaching each other, and that the folding operation stops, and an overlapping part between the two screen portions is detected by the sensor of the flexible screen terminal device. The overlapping part refers to a display area with smaller display size and a projection part of the display area with smaller display area on the other display area in the normal direction, after the flexible screen is folded. If the proportion of the overlapping part between the two screen portions to the main screen display area before split-screen is more than 70%, the folding process is determined as being invalid. If the proportion of the overlapping part between the two screen portions to the main screen display area is less than or equal to 30% before split-screen, the display area of the overlapping part is turned off after the overlapping part between the two screen portions is determined, the display content of the display interface before split-screen is displayed in a non-overlapping display area, and the interface layout of the display content in the non-overlapping display area is adjusted according to the proportion of the non-overlapping display area to the main screen display area before split-screen.

According to an embodiment of the present disclosure, a screen included angle between the first display area and the second display area of the flexible screen terminal device is determined on the basis of the folding boundary line, and a split-screen display operation is performed on the basis of the screen included angle and the preset display rule, such that the split-screen display of the flexible screen terminal device is realized according to the screen included angle. In such a way, the accurate split-screen display is performed according to the screen included angle and the folding operation, for better user experience.

According to an embodiment of the present disclosure, a non-transitory computer-readable storage medium storing a display program of the flexible screen terminal device is further provided, where the display program of the flexible screen terminal device, when executed by a processor, causes the processor to perform the following operations: determining a folding boundary line corresponding to a folding operation when the folding operation corresponding to the flexible screen terminal device is detected; and performing a split-screen display operation on the basis of the folding boundary line and a preset display rule of the flexible screen terminal device.

According to an embodiment of the present disclosure, the display program of the flexible screen terminal device, when executed by the processor, causes the processor to further perform the following operations: determining whether the folding operation is a valid folding operation when the folding operation corresponding to the flexible screen terminal device is detected; acquiring coordinate information corresponding to the folding operation if the folding operation is a valid folding operation; and determining the folding boundary line on the basis of the coordinate information.

According to an embodiment of the present disclosure, the display program of the flexible screen terminal device, when executed by the processor, causes the processor to further perform the following operations: determining whether a folding angle corresponding to the folding operation reaches a preset angle; and determining that the folding operation is a valid folding operation if the folding angle reaches the preset angle.

According to an embodiment of the present disclosure, the display program of the flexible screen terminal device, when executed by the processor, causes the processor to further perform the following operations: determining whether a touch operation is detected in a display area to which the folding operation belongs within a first preset time period when the folding operation corresponding to the flexible screen terminal device is detected; acquiring a touch parameter corresponding to the touch operation if the touch operation is detected; determining whether the touch parameter meets a preset condition; and determining that the folding operation is a valid folding operation when the touch parameter meets the preset condition.

According to an embodiment of the present disclosure, the display program of the flexible screen terminal device, when executed by the processor, causes the processor to further perform the following operations: determining whether a sliding distance reaches a first preset distance; and determining that the touch parameter meets the preset condition if the sliding distance reaches the first preset distance.

According to an embodiment of the present disclosure, the display program of the flexible screen terminal device, when executed by the processor, causes the processor to further perform the following operations: determining whether a number of pressing times reaches a preset number of times and whether a distance between touch points is greater than a second preset distance; and determining that the touch parameter meets the preset condition if the number of pressing times reaches the preset number of times and the distance between touch points is greater than the second preset distance.

According to an embodiment of the present disclosure, the display program of the flexible screen terminal device, when executed by the processor, causes the processor to further perform the following operations: acquiring a coordinate set of touch points corresponding to the touch operation; and determining the coordinate information according to the coordinate set of touch points.

According to an embodiment of the present disclosure, the display program of the flexible screen terminal device, when executed by the processor, causes the processor to further perform the following operations: determining a screen included angle between a first display area and a second display area corresponding to the flexible screen terminal device on the basis of the folding boundary line; and performing the split-screen display operation on the basis of the screen included angle and the preset display rule.

It should be noted that in this context, the terms "including", "comprising" or any other variation thereof are intended to cover non-exclusive inclusion, so that a process, method, article or system including a series of elements includes not only those elements, but also other elements not explicitly listed, or elements inherent to such a process, method, article or system. Without further restrictions, the element defined by the statement "including a . . . " does not exclude the existence of other identical elements in the process, method, article or system including the element.

The above serial numbers of the embodiments of the present disclosure are for illustrative only, and do not represent the advantages and disadvantages of the embodiments.

Through the description of the above embodiments, it can be understood by those having ordinary skill in the art that, the method of the above embodiments can be realized by means of software and necessary general hardware platform, and optionally the method can be realized by hardware, and the former may be a better solution in many cases. Based on this understanding, the technical schemes of the present disclosure or the part that contributes to the prior art can be embodied in the form of a software product, which is stored in a storage medium (such as ROM/RAM, magnetic disk, optical disk) as described above, including several instructions to enable a terminal device (which may be a mobile phone, a computer, a server, an air conditioner, or a network device, etc.) to perform the methods described in various embodiments of the present disclosure.

The above description contains only some of the embodiments of the present disclosure, and is not intended to limit the scope of the present disclosure. Any equivalent structure or process variations made in accordance with the specification and drawings of the present disclosure, or directly or indirectly applied to other related technical fields, shall be included in the scope of patent protection of the present disclosure.

What is claimed are:

1. A display method for a flexible screen terminal device, comprising:
   in response to a detection of a folding operation at any position corresponding to the flexible screen terminal, determining whether a touch operation is detected in a display area to which the folding operation belongs within a first preset time period;
   in response to a detection of the touch operation, acquiring a touch parameter corresponding to the touch operation in response to determining that the touch parameter meets the preset condition, determining that the folding operation is a valid folding operation;
   wherein the preset condition of the touch parameter comprises:
      determining whether a sliding distance of a sliding touch operation reaches a first preset distance; or
      determining whether a number of pressing times of a pressing operation reaches a preset number of times, and whether the distance between touch points is greater than a second preset distance;
   in response to determining the folding operation being the valid folding operation, acquiring coordinate information corresponding to the folding operation;
   determining a folding boundary line corresponding to the folding operation based on the coordinate information; and
   performing a split-screen display operation based on the folding boundary line and a preset display rule of the flexible screen terminal;
   wherein the preset display rule comprises:
   in response to a determining that a proportion of an overlapping portion between two parts of the display area is larger than a first threshold value, determining that the folding operation is invalid, and prompting a user to reconfirm the folding boundary line; or
   in response to a determining that the proportion of the overlapping portion between two parts of the display area is less than a second threshold value, turning off the overlapping portion, and displaying a display content in a non-overlapping display area according to the proportion of the non-overlapping display area to the main screen display area before split-screen.

2. The display method for the flexible screen terminal device of claim 1, wherein determining whether the folding operation is the valid folding operation comprises:
   determining whether a folding angle corresponding to the folding operation reaches a preset angle; and
   determining that the folding operation is the valid folding operation in response to determining that the folding angle reaches the preset angle.

3. The display method for the flexible screen terminal device of claim 2, wherein performing a split-screen display operation based on the folding boundary line and a preset display rule comprises:
  determining a screen included angle between a first display area and a second display area corresponding to the flexible screen terminal device based on the folding boundary line; and
  performing the split-screen display operation based on the screen included angle and the preset display rule.

4. The display method for the flexible screen terminal device of claim 1, wherein,
  determining that the touch parameter meets the preset condition in response to determining that the sliding distance reaches the first preset distance.

5. The display method for the flexible screen terminal device of claim 4, wherein performing a split-screen display operation based on the folding boundary line and a preset display rule comprises:
  determining a screen included angle between a first display area and a second display area corresponding to the flexible screen terminal device based on the folding boundary line; and
  performing the split-screen display operation based on the screen included angle and the preset display rule.

6. The display method for the flexible screen terminal device of claim 1, wherein,
  determining that the touch parameter meets the preset condition in response to determining that the number of pressing times reaches the preset number of times and the distance between touch points is greater than the second preset distance.

7. The display method for the flexible screen terminal device of claim 6, wherein performing a split-screen display operation based on the folding boundary line and a preset display rule comprises:
  determining a screen included angle between a first display area and a second display area corresponding to the flexible screen terminal device based on the folding boundary line; and performing the split-screen display operation based on the screen included angle and the preset display rule.

8. The display method for the flexible screen terminal device of claim 1, wherein acquiring coordinate information corresponding to the folding operation comprises:
  acquiring a coordinate set of touch points corresponding to the touch operation; and
  determining the coordinate information according to the coordinate set of touch points.

9. The display method for the flexible screen terminal device of claim 8, wherein performing a split-screen display operation based on the folding boundary line and a preset display rule comprises:
  determining a screen included angle between a first display area and a second display area corresponding to the flexible screen terminal device based on the folding boundary line; and
  performing the split-screen display operation based on the screen included angle and the preset display rule.

10. The display method for the flexible screen terminal device of claim 1, wherein performing a split-screen display operation based on the folding boundary line and a preset display rule comprises:
  determining a screen included angle between a first display area and a second display area corresponding to the flexible screen terminal device based on the folding boundary line; and
  performing the split-screen display operation based on the screen included angle and the preset display rule.

11. A flexible screen terminal device, comprising a memory, a processor and a display program of the flexible screen terminal stored in the memory and executable on the processor, wherein the display program of the flexible screen terminal, when executed by the processor, causes the processor to perform a display method for a flexible screen terminal device, the display method comprising:
  in response to a detection of a folding operation at any position corresponding to the flexible screen terminal, determining whether a touch operation is detected in a display area to which the folding operation belongs within a first preset time period;
  in response to a detection of the touch operation, acquiring a touch parameter corresponding to the touch operation;
  in response to determining that the touch parameter meets the preset condition, determining that the folding operation is a valid folding operation;
  wherein the preset condition of the touch parameter comprises:
    determining whether a sliding distance of a sliding touch operation reaches a first preset distance; or
    determining whether a number of pressing times of a pressing operation reaches a preset number of times, and whether the distance between touch points is greater than a second preset distance;
  in response to determining the folding operation being the valid folding operation, acquiring coordinate information corresponding to the folding operation;
  determining a folding boundary line corresponding to the folding operation based on the coordinate information; and
  performing a split-screen display operation based on the folding boundary line and a preset display rule of the flexible screen terminal;
  wherein the preset display rule comprises:
    in response to a determining that a proportion of an overlapping portion between two parts of the display area is larger than a first threshold value, determining that the folding operation is invalid, and prompting a user to reconfirm the folding boundary line; or
    in response to a determining that the proportion of the overlapping portion between two parts of the display area is less than a second threshold value, turning off the overlapping portion, and displaying a display content in anon-overlapping display area according to the proportion of the non-overlapping display area to the main screen display area before split-screen.

12. The flexible screen terminal device of claim 11, wherein determining whether the folding operation is the valid folding operation comprises:
  determining whether a folding angle corresponding to the folding operation reaches a preset angle; and
  determining that the folding operation is the valid folding operation in response to determining that the folding angle reaches the preset angle.

13. The flexible screen terminal device of claim 11, wherein,
  determining that the touch parameter meets the preset condition in response to determining that the sliding distance reaches the first preset distance.

14. The flexible screen terminal device of claim 11, wherein,
  determining that the touch parameter meets the preset condition in response to determining that the number of pressing times reaches the preset number of times and the distance between touch points is greater than the second preset distance.

15. The flexible screen terminal device of claim 11, wherein acquiring coordinate information corresponding to the folding operation comprises:
   acquiring a coordinate set of touch points corresponding to the touch operation; and
   determining the coordinate information according to the coordinate set of touch points.

16. A non-transitory computer-readable storage medium storing a display program of a flexible screen terminal, wherein the display program of the flexible screen terminal, when executed by a processor, causes the processor to perform a display method for a flexible screen terminal device, the display method comprising:
   in response to a detection of a folding operation at any position corresponding to the flexible screen terminal, determining whether a touch operation is detected in a display area to which the folding operation belongs within a first preset time period;
   in response to a detection of the touch operation, acquiring a touch parameter corresponding to the touch operation;
   in response to determining that the touch parameter meets the preset condition, determining that the folding operation is a valid folding operation;
   wherein the preset condition of the touch parameter comprises:
      determining whether a sliding distance of a sliding touch operation reaches a first preset distance; or
      determining whether a number of pressing times of a pressing operation reaches a preset number of times, and whether the distance between touch points is greater than a second preset distance;
   in response to determining the folding operation being the valid folding operation, acquiring coordinate information corresponding to the folding operation;
   determining a folding boundary line corresponding to the folding operation based on the coordinate information; and
   performing a split-screen display operation based on the folding boundary line and a preset display rule of the flexible screen terminal;
   wherein the preset display rule comprises:
      in response to a determining that a proportion of an overlapping portion between two parts of the display area is larger than a first threshold value, determining that the folding operation is invalid, and prompting a user to reconfirm the folding boundary line; or
      in response to a determining that the proportion of the overlapping portion between two parts of the display area is less than a second threshold value, turning off the overlapping portion, and displaying a display content in anon-overlapping display area according to the proportion of the non-overlapping display area to the main screen display area before split-screen.

17. The non-transitory computer-readable storage medium of claim 16, wherein determining whether the folding operation is the valid folding operation comprises:
   determining whether a folding angle corresponding to the folding operation reaches a preset angle; and
   determining that the folding operation is the valid folding operation in response to determining that the folding angle reaches the preset angle.

18. The non-transitory computer-readable storage medium of claim 16, wherein,
   determining that the touch parameter meets the preset condition in response to determining that the sliding distance reaches the first preset distance.

19. The non-transitory computer-readable storage medium of claim 16, wherein,
   determining that the touch parameter meets the preset condition in response to determining that the number of pressing times reaches the preset number of times and the distance between touch points is greater than the second preset distance.

20. The non-transitory computer-readable storage medium of claim 16, wherein acquiring coordinate information corresponding to the folding operation comprises:
   acquiring a coordinate set of touch points corresponding to the touch operation; and determining the coordinate information according to the coordinate set of touch points.

* * * * *